United States Patent [19]

Zimmer et al.

[11] Patent Number: 5,342,602
[45] Date of Patent: Aug. 30, 1994

[54] PROCESS FOR REDUCING THE CARBON CONTENT OF AQUEOUS HYDROGEN PEROXIDE SOLUTIONS

[75] Inventors: Gerhard Zimmer, Konigstein; Heike Kinz, Hanau; Elfriede Sextl, Geiselbach, all of Fed. Rep. of Germany

[73] Assignee: Degussa Aktiengesellschaft, Frankfurt, Fed. Rep. of Germany

[21] Appl. No.: 159,578

[22] Filed: Dec. 1, 1993

[30] Foreign Application Priority Data

Dec. 1, 1992 [DE] Fed. Rep. of Germany ........ 4240370

[51] Int. Cl.$^5$ .............................................. C01B 15/01
[52] U.S. Cl. ..................................................... 423/584
[58] Field of Search ................................. 423/584, 588

[56] References Cited

U.S. PATENT DOCUMENTS

| | | |
|---|---|---|
| 3,294,488 | 12/1966 | Dunlop et al. ...................... 423/584 |
| 3,305,314 | 2/1967 | Freeland et al. ..................... 423/584 |
| 3,387,938 | 6/1968 | Leaver ................................ 423/584 |
| 3,556,727 | 1/1971 | Thirion ............................... 423/584 |
| 3,664,812 | 5/1972 | Hoyt .................................. 423/584 |
| 4,792,403 | 12/1988 | Togo et al. .......................... 423/584 |
| 4,985,228 | 1/1991 | Kirksey ............................... 423/584 |
| 5,232,680 | 8/1993 | Honig et al. ........................ 423/584 |
| 5,268,160 | 12/1993 | Albal et al. ......................... 423/584 |

FOREIGN PATENT DOCUMENTS

| | | |
|---|---|---|
| 0502466 | 9/1992 | European Pat. Off. . |
| 3822348 | 1/1990 | Fed. Rep. of Germany . |
| 26095 | 7/1971 | Japan ................................. 423/584 |
| 17106 | 1/1993 | Japan ................................. 423/584 |
| 547571/6 | 3/1985 | Spain . |
| 841323 | 7/1960 | United Kingdom . |

OTHER PUBLICATIONS

Beyer, H. K. et al., "A new method for dealumination of fujasite-typezeolites", in Catalysis by Zeolites (1980), ed. by B. Imelik, pp. 203–210.
Ullmann's Encyclopedia of Industrial Chemistry, vol. A13, 5th ed. (1989), pp. 447–457.

*Primary Examiner*—Wayne Langel
*Attorney, Agent, or Firm*—Beveridge, DeGrandi, Weilacher & Young

[57] ABSTRACT

Aqueous hydrogen peroxide solutions contain variable amounts of carbon compounds following their production by the so-called anthraquinone process. Various methods are known for separating out carbon compounds, including those using organic ion exchangers or macro-porous organic adsorber resins. Described is a process using a solid adsorption agent, which can be regenerated without causing any problems, whereby the carbon content is reduced. The solid adsorption agent is a zeolite from the set of dealuminised H-Y-zeolites with a ($SiO_2/Al_2O_3$) ratio equal to or greater than 20 or H-mordenites with a ($SiO_2/Al_2O_3$) ratio of at least 20.

11 Claims, No Drawings

PROCESS FOR REDUCING THE CARBON CONTENT OF AQUEOUS HYDROGEN PEROXIDE SOLUTIONS

INTRODUCTION AND BACKGROUND

The present invention relates to a process for reducing the carbon content of aqueous hydrogen peroxide solutions. The process is directed in particular at aqueous hydrogen peroxide solutions which are obtained within the context of the so-called anthraquinone process for preparing hydrogen peroxide.

Hydrogen peroxide may be produced in a variety of ways, but the anthraquinone cyclic process is the most significant from an industrial point of view. As shown in Ullmann's Encyclopedia of Industrial Chemistry, Vol. A13, 5th ed. (1989), pages 447–457, this cyclic process includes (a) hydrogenation of an alkylanthraquinone in an organic solvent or solvent mixture which is not miscible, or only slightly miscible, with water, (b) oxidation of the alkylanthrahydroquinone which is formed with the formation of hydrogen peroxide and re-formation of the alkylanthraquinone, (c) extraction of the hydrogen peroxide with water and (d) various steps for purifying the aqueous $H_2O_2$ solutions which depend on the desired quality of the $H_2O_2$.

The $H_2O_2$ solution obtained following extraction contains volatile and non-volatile carbon compounds, depending on the particular process. In order to fulfill quality requirements, various methods for reducing the carbon content (C-content) have been disclosed. The C-content of the aqueous $H_2O_2$ extract can be reduced, for instance, by using extractive measures (see for example GB 841 323). However, this type of method is very expensive and the residual C-content thereby achieved does not in general correspond to the requirements demanded for high quality $H_2O_2$ solutions.

A simplified and improved method is disclosed in U.S. Pat. No. 4,759,921 wherein the residual C-content of an aqueous $H_2O_2$ solution is lowered by 100 to 120 mg/l by phase separation of a mixture of the $H_2O_2$ extract and 0.5 to 5% by weight of a quinone solvent using a special coalescer. Although some volatile C-compounds can be separated out during concentration of the $H_2O_2$ extract, the product still contains too high a residual C-content for many purposes.

A method for lowering the carbon content of aqueous $H_2O_2$ solutions is known from U.S. Pat. No. 2,919,975 which includes distillative concentration, treatment of the previously diluted concentrate with activated carbon at a temperature of less than 10° C., and isolation of the activated carbon loaded with adsorbed carbon compounds. The disadvantages of this method include the following: only selected types of activated carbon, optionally pre-treated in a particular way, can be used; the carbon depleted $H_2O_2$ solution sometimes requires an additional subsequent concentration step; the adsorption treatment is energy-consuming due to the cooling which is required; and the loaded activated carbon cannot be regenerated or can only be regenerated by using complicated procedures. A further development of the adsorption of carbon compounds contained in hydrogen peroxide solutions onto activated carbon is disclosed in U.S. Pat. No. 4,985,228 but the disadvantages pointed out above have not been overcome.

According to the process in U.S. Pat. No. 3,305,314, the $H_2O_2$ solution is treated with an anion exchanger, preferably a strongly basic ion exchanger with quaternary ammonium groups in the form of a salt of an acid which is weaker than acetic acid, in order to reduce the C-content of aqueous $H_2O_2$ solutions. Although anionic carbon compounds can be removed using this process, hardly any neutral and no cationic carbon compounds are removed. The use of an ion exchanger is not without problems from the safety aspect and regeneration involves very complex technical procedures in order to satisfy official limitations placed on effluents.

It is also known that the carbon content can be reduced by using organic adsorber resins with a macroporous structure (see ES-A 547 571/6). The disadvantage of these resins is in particular the considerable cost of regeneration. After rinsing the resin with water, they have to be treated with an organic solvent and then the solvent has to be displaced again by water. Apart from solvent losses, there is also the production of an effluent which has to be disposed of.

As explained above, the previously known methods for reducing the C-content of aqueous $H_2O_2$ solutions are still not completely satisfactory, so there is an interest in an improved and/or new type of process.

SUMMARY OF THE INVENTION

An object of the present invention is to provide a process for reducing the carbon content of aqueous hydrogen peroxide solutions by placing the same in contact with a solid adsorption agent and subsequent separation of the loaded adsorption agent. The adsorption agent should not only be highly effective with respect to carbon reduction but also, as far as possible, not act in a way which decomposes hydrogen peroxide. Additionally, the adsorption agent should be completely harmless from a safety point of view and regeneration should be simple.

It was found that the above object is solved by using a zeolite from the set of dealuminised H-Y-zeolites with a $(SiO_2/Al_2O_3)$ ratio equal to or greater than 20, or H-mordenite with a $(SiO_2/Al_2O_3)$ ratio of at least 20, as a solid adsorption agent. The letter H in the dealuminised H-Y-zeolite or H-mordenite to be used, as is customary for zeolites, means that it is essentially the protonated form of the zeolite. Preferably, dealuminised H-Y-zeolites with a $(SiO_2/Al_2O_3)$ ratio greater than 50, in particular greater than 100, are used; in principle, a dealuminised H-Y-zeolites with a $(SiO_2/Al_2O_3)$ ratio of 1000 is possible.

DETAILED DESCRIPTION OF THE INVENTION

A variety of processes are well known in the art for dealuminising Y-zeolites (see H. K. Beyer and Ita Belenykaja in "Catalysis by Zeolites" (1980), ed. by B. Imelik, pages 203–210), especially those which use silicon tetrachloride and which are generally performed at a temperature of about 400° C. in the first stages, and those which use water vapor. Dealuminised H-Y-zeolites produced by the first method are preferred in the process according to the present invention because they have fewer defects than products produced by the second method. Especially preferred are dealuminised H-Y-zeolites with a $(SiO_2/Al_2O_3)$ ratio greater than 150 and which are prepared by gasphase dealuminisation of a Y-zeolite with silicon tetrachloride. The zeolites are widely known in the art and reference is made to Kirk-Othmer, The Encyclopedia of Chemical Technology, Third Edition, Vol. 15, pages 638–669. Therefore, with the minimum values of the $SiO_2/Al_2O_3$ ratio specified herein, one skilled in the art would know what zeolites to select.

To perform the process according to the present invention, the aqueous hydrogen peroxide solution may be treated with the herein described zeolite either batchwise or continuously. The zeolite may be suspended in the hydrogen peroxide solution to be treated. Separation of the zeolite after treatment may take place using known methods for solid/liquid phase separation. In the event of continuous performance of the process, it is expedient to continuously introduce the hydrogen peroxide solution to be treated into a suspension which is located in a circulation reactor or zone and to withdraw treated solution via a solid/liquid separating device (e.g., a cross current filtration zone or device) arranged in the circulation reactor circuit. According to an alternative method of treatment, the zeolite is arranged in a fixed-bed reactor over which the solution to be treated is passed once or several times.

Whereas powdered zeolite is preferably used for treatment in suspension, powdered or shaped zeolite (e.g., cylinders or hollow cylinders) may be used in the case of the embodiment with a fixed-bed. Such products are known in the art; see Kirk-Othmer, supra.

The process according to the present invention is usually performed at a temperature in the range of 10° to 30° C. Any concentrated solutions, thus also concentrated hydrogen peroxide solutions, may be treated according to the present invention whereby the carbon content may be reduced to about 20% (and possibly to about 10%) of the carbon content of the initial solution. There is virtually no decomposition of the hydrogen peroxide during treatment when using the herein described zeolites in the process according to the present invention. In contrast, it has been shown that numerous other zeolites, including zeolites of the ZSM-5 types which are known for adsorption purposes, are catalytically active, that is bubbles are produced immediately after the addition of the zeolite or during or after treatment of the hydrogen peroxide solution, an indication of the decomposition of hydrogen peroxide.

The zeolites to be used according to the process of the present invention can be regenerated in a simple way when fully loaded. Regeneration can take place either by calcination at a temperature of up to 1000° C., wherein the organic components undergo combustion, or wet-chemical oxidative processes may also be used for regeneration because the zeolites to be used according to the present invention are stable to strong oxidizing agents such as, for example, Caro's acid.

It could not have been predicted that it would be possible to reduce the carbon content using a simple treatment method (i.e., by using specially selected zeolites) without catalytic decomposition of the hydrogen peroxide. Zeolites other than those to be used according to the present invention are proven to be actually catalytically active, so that they are not suitable for the purpose according to the present invention despite possibly adequate adsorption properties. The zeolites to be used according to the present invention are not only highly effective but they also enable a high specific loading with the carbon compounds contained in aqueous hydrogen peroxide solution. Due to their inorganic structure, zeolites can be regenerated in a simple way without the production of effluents. If desired, however, a wet-chemical regeneration procedure may also be used, for instance one using an oxidizing agent. In addition to carbon compounds, neutral and cationic inorganic compounds (e.g., tin and phosphorus compounds) are also eliminated, at least to some extent, during treatment according to the process of the present invention.

EXAMPLE 1

Determining the adsorption equilibrium of Wessalith ® DAY (dealuminised Y-zeolite) with a ($SiO_2/Al_2O_3$) ratio of 200, H form (from Degussa AG-Technical Information No. 4307.0/June 1991): 5 g of DAY zeolite were added to 50 ml of 70% by wt. strength aqueous $H_2O_2$ solution with a total C-content (TC) of 383 mg/l and shaken in a conical flask. The reference sample contained no zeolite. The results are given in the following table:

| Time (h) | Reference Sample TC* (mg/l) | With DAY zeolite TC (mg/l) | Load mg TC/g DAY (ad) |
|---|---|---|---|
| 0.5 | n.d | 87 | 2.6 |
| 2 | n.d. | 80 | 3.0 |
| 8 | n.d. | 74 | 2.8 |
| 24 | 384 | 80 | 2.8 | n.d. = not determined
ad = absolutely dry
*The amount of inorganic carbon (TIC) was less than the analytically detectable limit of equal to or less than 3 mg/l. The total C-content (TC) thus corresponded in principle to organic carbon (TOC), which was cited in the determination.

The carbon content was reduced by about 300 mg/l through use of the DAY zeolite. The adsorption equilibrium was reached within a maximum of one hour.

EXAMPLES 2–4 AND COMPARISON EXAMPLES 1–3

Treatment of 70% by wt. strength $H_2O_2$ solution with different zeolites: 250 ml of $H_2O_2$ solution were added to 25 g of zeolite powder which had been weighed in a 500 ml conical flask, and shaken for 2 h. The mix was then centrifuged and the $H_2O_2$ solution analyzed. The types of zeolite and the results with reference to decomposition of the hydrogen peroxide are given in the following table:

| | Type of zeolite (ratio) | Decomposition (formation of bubbles) |
|---|---|---|
| Example no. | | |
| 2 | DAY (200) | none |
| 3 | H-mordenite (20) | very slight decomposition |
| 4 | H-Y (56) | after separating out the zeolite |
| Comparison example | | |
| C1 | H-ZSM-5 (45) | vigorous, foams from the start |
| C2 | Na-ZSM-5 (45) | moderate, bubbles form |
| C3 | H-ZSM-5 (1000) | on the zeolite particles |

EXAMPLES 5 AND 6

Treatment of 70 and 50% by wt. strength $H_2O_2$ solution with DAY zeolite (H-form, ($SiO_2/Al_2O_3$) ratio 200). 25 g of zeolite and 250 ml of $H_2O_2$ solution were shaken together for 2 hours each time. The treated $H_2O_2$ solution and the load on the zeolite were determined after phase separation by centrifuging. For comparison purposes, a sample with no zeolite was also shaken for 2 hours each time. The results are given in the following table:

| Example no. | Carbon content (TC) (mg/l) | Load mg TC/g zeolite (ad) |
| --- | --- | --- |
| 5 | 95 | 2.8 |
| Reference sample | 390 | — |
| 6 | 44 | 1.5 |
| Reference sample | 200 | — |

Further variations and modifications of the foregoing will be apparent to those skilled in the art and such variations and modifications are attended to be encompassed by the claims that are appended hereto.

German Priority Application P 42 40 370.7, filed on Dec. 1, 1992, is relied on and incorporated by reference.

What is claimed:

1. A process for reducing the carbon content in an aqueous hydrogen peroxide solution which contains carbon compounds, said process comprising contacting said aqueous hydrogen peroxide solution with a solid adsorption agent and then optionally separating the loaded solid adsorption agent, wherein said solid adsorption agent is a dealuminised H-Y-zeolite with a ($SiO_2/Al_2O_3$) ratio equal to or greater than 20 or a H-mordenite with a ($SiO_2/Al_2O_3$) ratio of at least 20.

2. The process according to claim 1, wherein said dealuminised H-Y-zeolite has a ($SiO_2/Al_2O_3$) ratio greater than 50.

3. The process according to claim 1, wherein said dealuminised H-Y-zeolite has a ($SiO_2/Al_2O_3$) ratio greater than 100.

4. The process according to claim 2, wherein said dealuminised H-Y-zeolite has a ($SiO_2/Al_2O_3$) ratio greater than 150 and is prepared by gaseous-phase dealuminisation of a Y-zeolite with silicon tetrachloride.

5. The process according to claim 1, wherein said contacting occurs at a temperature of 10° to 30° C.

6. The process according to claim 1, wherein the content of neutral and cationic inorganic compounds in the aqueous hydrogen peroxide solution is also reduced.

7. The process according to claim 1, further comprising suspending said solid adsorption agent in the hydrogen peroxide solution to form a suspension in a circulation reaction zone and withdrawing treated hydrogen peroxide by solid/liquid separation.

8. The process according to claim 1, wherein said hydrogen peroxide solution is passed over said solid adsorption agent.

9. The process according to claim 1, wherein said solid adsorption agent is present in the form of powder or a shaped form.

10. The process according to claim 1, further comprising regenerating said solid adsorption agent.

11. The process according to claim 10, wherein said regenerating is by calcination at temperatures up to 1000° C.

* * * * *